(No Model.)
L. HOLT.
INFLATING PUMP FOR INFLATING PNEUMATIC TIRES.
No. 515,474. Patented Feb. 27, 1894.
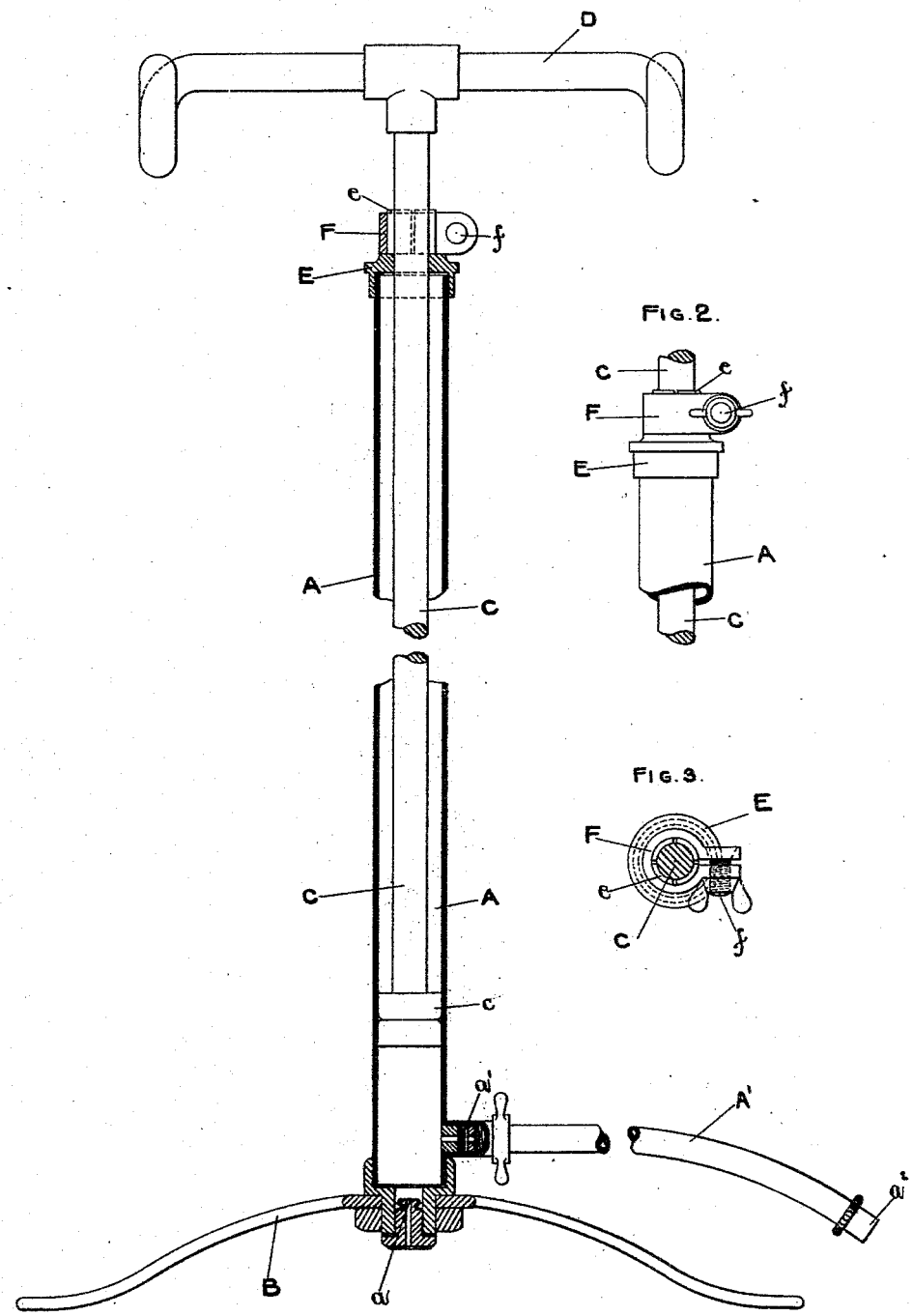
WITNESSES.
INVENTOR:
Leopold Holt
Per Robt. C. d. Phillips
Attorney.

UNITED STATES PATENT OFFICE.

LEOPOLD HOLT, OF FRANKFORT-ON-THE-MAIN, GERMANY.

INFLATING-PUMP FOR INFLATING PNEUMATIC TIRES.

SPECIFICATION forming part of Letters Patent No. 515,474, dated February 27, 1894.

Application filed July 24, 1893. Serial No. 481,278. (No model.) Patented in England December 6, 1892, No. 22,352.

*To all whom it may concern:*

Be it known that I, LEOPOLD HOLT, a subject of the Queen of Great Britain, temporarily residing at Frankfort-on-the-Main, in the Empire of Germany, have invented a new and useful Improvement in Inflating-Pumps for Inflating Pneumatic Tires, (for which I have obtained a patent in Great Britain, No. 22,352, bearing date December 6, 1892,) of which the following is a specification.

My invention consists in adapting an inflating pump used for inflating pneumatic tires to form a supporting stand for bicycles by forming the pump with a foot or base, by mounting on the top of the piston a bracket to support or carry the bicycle, and by forming on the cylinder or piston a locking clip whereby the two parts may be fixed together to provide for the adjustment of the height of the stand, the object being to form two useful articles in one and to provide a powerful pump for home use. I attain this end in the manner illustrated by the accompanying drawings, in which—

Figure 1 is a broken view in sectional elevation of my combined inflating pump and stand. Fig. 2 is a broken view in elevation of the locking clip. Fig. 3 is a view in plan thereof.

Throughout the views similar parts are marked with like letters of reference.

The cylinder A of the pump is mounted on a base or foot B of any suitable shape, and it is provided at its lower end with an inlet non-return valve $a$, and a delivery non-return valve $a'$. These valves may be of the type shown which is that generally used for inflating pumps, or of any other suitable type, and they are arranged either as shown or in any other convenient manner. To the delivery valve $a'$ is attached a flexible tube $A'$ provided with a screw connection $a^2$ for attachment to the valve of the tire.

The piston rod or plunger C is provided with a piston $c$ preferably formed of cup leathers as shown. On the top of the piston rod or plunger C is mounted a bracket D adapted to engage with any convenient part of the frame of the machine to be supported. The shape of the bracket D may be varied according to the type of machine it is intended to support.

The top end of the cylinder A is closed by a cap E having a split sleeve $e$ through which the piston rod or plunger C slides. This split sleeve is surrounded by a split clip collar F expanded and contracted by the transverse screw or bolt $f$. This device enables the piston rod or plunger C to be fixed to the cylinder A at any desired height when the pump is being used as a stand.

When the pump is to be used for inflating purposes, the clip collar is slackened to allow the piston rod or plunger to slide freely through the cap closing the top end of the cylinder.

As an alternative arrangement the clip collar F may be mounted direct on the piston rod C, so that it could be clamped or fixed thereto by the set screw $f$ in any desired position, so that when it rests on the top of the cap E closing the top end of the cylinder, the bracket D carried by the piston rod is at the necessary height to support the cycle.

I wish it to be particularly understood that I do not limit myself to the precise details of construction hereinbefore described and illustrated by the accompanying drawings but that I hold myself at liberty to make such changes and alterations as fairly fall within the spirit and scope of my invention. I would also have it understood that I lay no claim to the construction of the inflating pump *per se* as the details of its construction are well known and its component parts are of the usual type, and also that I lay no claim to the construction of a supporting stand formed in two parts so as to be adjustable in height, as such stands were well-known at the date of my invention.

What I claim as my invention, and desire to secure by Letters Patent, is—

1. The combination with an inflating pump, of a foot or base attached to the cylinder of the pump and adapted to keep the pump in an upright position, of a bracket attached to the free or top end of the piston rod or plunger and adapted to engage with the frame of a bicycle to support it in an upright position, and of a clip adapted to lock the two parts of the inflating pump together, as set forth.

2. The combination with an inflating pump, of a base or foot fixed to the cylinder and adapted to support it in an upright position, of a bracket carried by the top end of the piston rod or plunger and adapted to engage with the frame of a bicycle and so support it in an upright position, and of a flexible tube adapted to connect the delivery valve of the pump with the valve of a tire, as set forth.

3. In an inflating pump, the combination with the cylinder A, of the base or foot B attached thereto, of the inlet non-return valve $a$, of the delivery non-return valve $a'$ of the cap E having a split sleeve $e$, of the piston rod or plunger C fitted with a piston $c$, of the bracket D attached to the top end of the piston rod or plunger C, and of the clip collar G mounted on the split sleeve $e$ on the cap E, as set forth.

LEOPOLD HOLT.

Witnesses:
 ROBT. ED. PHILLIPS,
 GEO. T. CLARK.